United States Patent
Peter et al.

(10) Patent No.: US 11,338,843 B2
(45) Date of Patent: May 24, 2022

(54) WORM GEAR FOR A WORM GEAR MECHANISM OF A VEHICLE STEERING SYSTEM WITH A CARRIER RING INJECTED BETWEEN A HUB AND A TOOTHED WHEEL

(71) Applicants: thyssenkrupp Presta AG, Eschen (LI); thyssenkrupp AG, Essen (DE)

(72) Inventors: Manuel Peter, Hinwil (CH); Gernot Ernstson, Feldkirch (AT); Philipp Gottwald, Gams (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 103 days.

(21) Appl. No.: 16/768,727

(22) PCT Filed: Dec. 18, 2018

(86) PCT No.: PCT/EP2018/085637
§ 371 (c)(1),
(2) Date: Jun. 1, 2020

(87) PCT Pub. No.: WO2019/121771
PCT Pub. Date: Jun. 27, 2019

(65) Prior Publication Data
US 2021/0171092 A1    Jun. 10, 2021

(30) Foreign Application Priority Data

Dec. 22, 2017    (DE) .................... 10 2017 131 173.4

(51) Int. Cl.
*B62D 5/04*    (2006.01)
*F16H 1/16*    (2006.01)
(Continued)

(52) U.S. Cl.
CPC ............. *B62D 5/0409* (2013.01); *F16H 1/16* (2013.01); *F16H 55/06* (2013.01); *F16H 55/17* (2013.01); *F16H 2055/065* (2013.01)

(58) Field of Classification Search
CPC .............. F16H 2055/065; F16H 55/06; B29C 45/14491; B29C 2045/1454
See application file for complete search history.

(56) References Cited

U.S. PATENT DOCUMENTS

| 2010/0201030 A1* | 8/2010 | Oberle .................... F16H 55/06 264/262 |
| 2011/0011195 A1 | 1/2011 | Oberle |

(Continued)

FOREIGN PATENT DOCUMENTS

| DE | 10 2012 102 775 A | 10/2013 |
| DE | 10 2012 102 780 A | 10/2013 |

(Continued)

OTHER PUBLICATIONS

English Translation of International Search Report issued in PCT/EP2018/085637, dated Mar. 7, 2019.

*Primary Examiner* — Terence Boes
(74) *Attorney, Agent, or Firm* — thyssenkrupp North America, LLC

(57) ABSTRACT

A worm gear for a worm gear system of a motor vehicle steering device may include a hub, a support element, and a gear rim. The gear rim may have a multiplicity of teeth that extend radially outward from a central encircling annular web. The support element may be a support ring that by means of an injection-molding method is injected between the gear rim and the hub. The support element may connect in a form-fitting manner the hub and the gear rim. The gear (Continued)

rim may include reinforcement ribs that, on both end sides, from the teeth extend radially in a direction of a worm gear longitudinal axis.

15 Claims, 3 Drawing Sheets

(51) Int. Cl.
*F16H 55/06* (2006.01)
*F16H 55/17* (2006.01)

(56) References Cited

U.S. PATENT DOCUMENTS

| | | | |
|---|---|---|---|
| 2015/0308555 A1 | 10/2015 | Oberle | |
| 2018/0015944 A1* | 1/2018 | Knoll | B62D 5/0409 |
| 2020/0114948 A1* | 4/2020 | Dieringer | F16H 55/08 |
| 2020/0406961 A1* | 12/2020 | Ernstson | B62D 5/0454 |

FOREIGN PATENT DOCUMENTS

| | | | | |
|---|---|---|---|---|
| DE | 10 2014 104 284 A | 10/2015 | | |
| EP | 0 619 445 A | 10/1994 | | |
| EP | 0619445 A1 * | 10/1994 | | B29C 45/1671 |
| EP | 1 777 439 A | 4/2007 | | |
| EP | 1 780 445 A | 5/2007 | | |
| EP | 2 899 430 A | 7/2015 | | |
| WO | 2015/144412 A | 10/2015 | | |

* cited by examiner

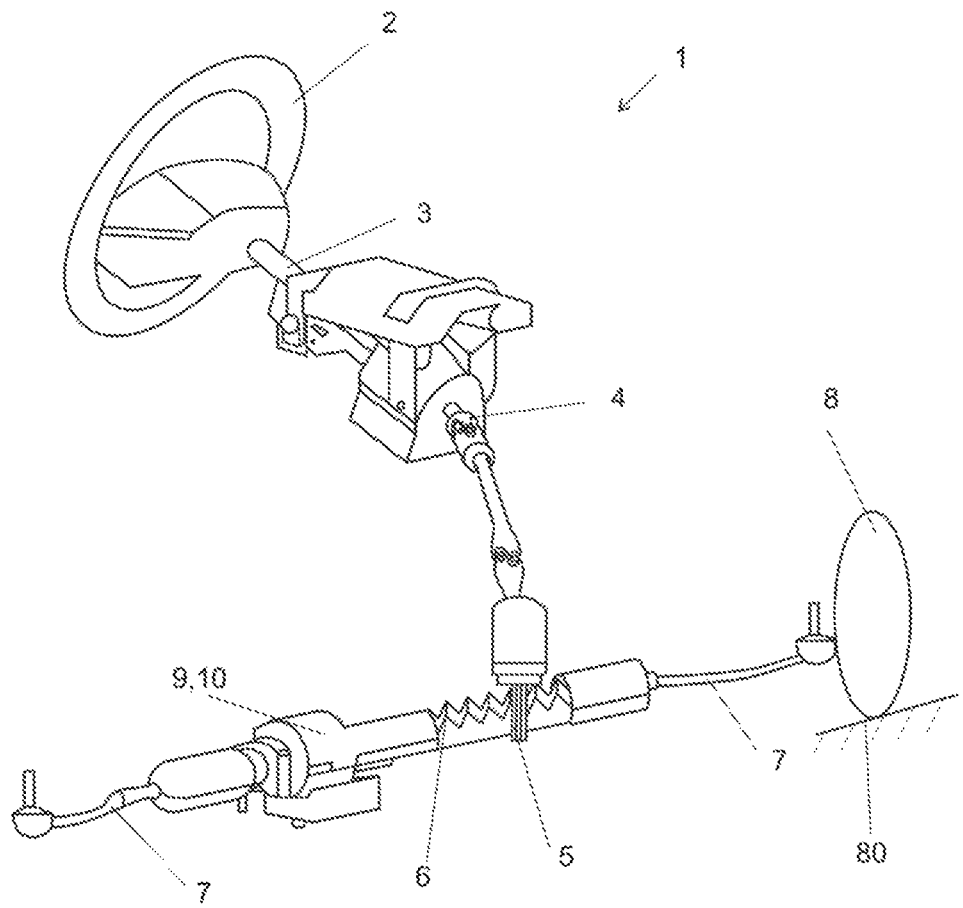
FIGURE 1
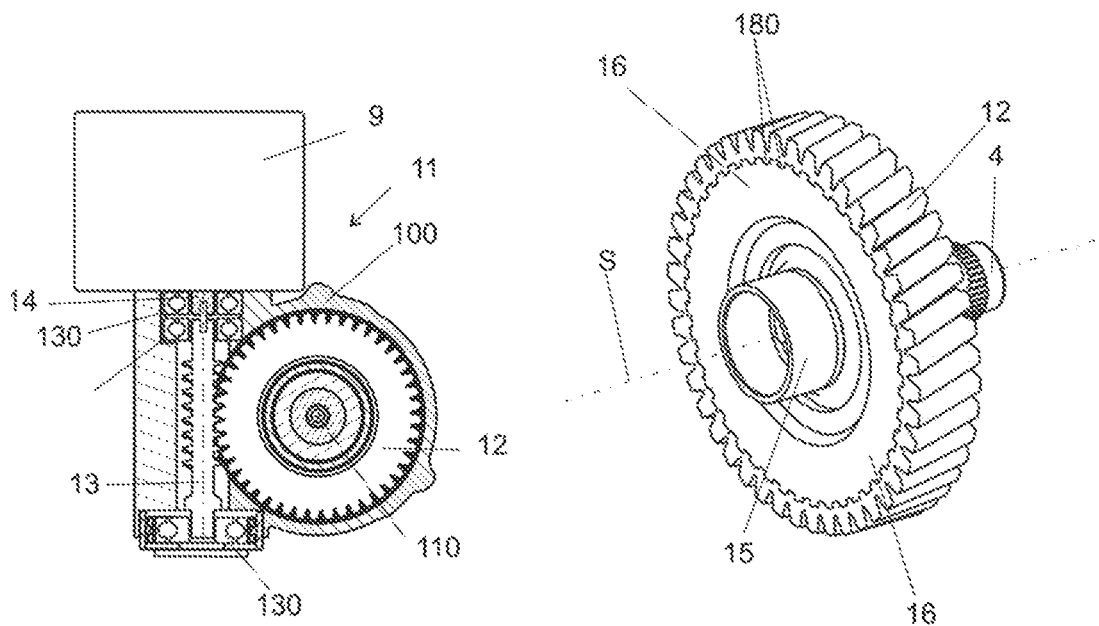
FIGURE 2  FIGURE 3

WORM GEAR FOR A WORM GEAR MECHANISM OF A VEHICLE STEERING SYSTEM WITH A CARRIER RING INJECTED BETWEEN A HUB AND A TOOTHED WHEEL

CROSS REFERENCE TO RELATED APPLICATIONS

This application is a U.S. National Stage Entry of International Patent Application Serial Number PCT/EP2018/085637, filed Dec. 18, 2018, which claims priority to German Patent Application No. DE 10 2017 131 173.4, filed Dec. 22, 2017, the entire contents of both of which are incorporated herein by reference.

FIELD

The present disclosure generally relates to steering systems, including a worm gear for a worm gear system of a motor vehicle steering device.

BACKGROUND

Gear systems which transmit an auxiliary torque from an electric motor to a steering shaft are inter alia required in the use of electro-mechanical power-assisted steering devices. The electric motor usually drives a worm which engages with a worm gear which is disposed in a rotationally fixed manner on the steering shaft or on a pinion.

The worm gear comprises an insert which is connectable in a rotationally fixed manner to the steering shaft or to the pinion, wherein said insert is enhanced with a plastics material. Said plastics material configures the so-called gear rim.

A gear wheel having an insert part which has a radial elevation is known from the first and unexamined publication EP 1 780 445 A1, wherein said insert part is enhanced with a gear rim configured by overmolding. A disadvantage of this solution lies in the radial disposal of the elevation, on account of which unfavorable flow conditions are created in the plastics material when injecting and a non-homogenous plastics-material structure is configured.

Thus a need exists for a worm gear for a worm gear system of a motor vehicle steering device, said worm gear by way of ideally simple means having a plastics-material structure with improved homogeneity.

BRIEF DESCRIPTION OF THE FIGURES

FIG. 1 is a schematic view of an example electro-mechanical motor vehicle steering device.

FIG. 2 is a cross-sectional view through an example worm gear system.

FIG. 3 is a spatial view of an example worm gear.

DETAILED DESCRIPTION

Figure 4:
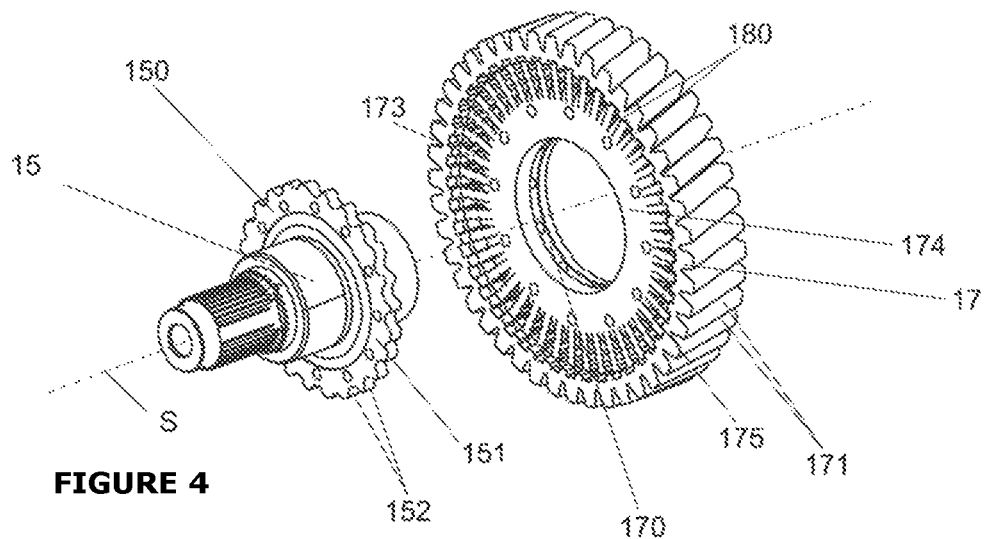
FIG. 4 is an exploded view of the worm gear from FIG. 3 without a support ring.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to worm gears for worm gear systems of motor vehicle steering devices. The present disclosure also relates to worm gear systems for motor vehicle steering devices, as well as methods for producing worm gears for worm gear systems of motor vehicle steering devices.

Accordingly, a worm gear for a worm gear system of a motor vehicle steering device is provided, comprising a hub, a support element, and a gear rim, wherein the gear rim has a multiplicity of teeth which extend radially outward in terms of a worm gear longitudinal axis, and wherein the support element is a support ring which by means of an injection-molding method is injected between the gear rim and the hub and which connects in a form-fitting manner the hub and the gear rim.

The gear rim preferably has reinforcement ribs which, on both end sides, from the teeth extend radially in the direction of the worm gear longitudinal axis or the gear rim center.

The insert part forming the hub is preferably made from steel.

The gear rim is preferably configured as a single-component plastics material part and thus so as to be integral. An application of teeth to a support part by means of injection-molding is thus unnecessary. The gear rim can thus be produced in a particularly economical manner.

The insert part preferably has a gear rim which engages in a corresponding recess in an internal side of the gear rim. The insert part and the gear rim can thus be connected to one another in a simple manner in a first production step.

It is advantageous for the gear rim to have injection bores which between the worm gear longitudinal axis and the reinforcement ribs are provided for injecting a plastics material for configuring the support ring. The gear rim and/or the support ring are/is preferably composed of artificial resin or a thermoplastic material, in particular of polyamide, polyoxymethylene, saturated polyester, polyether, and/or ether ketone, or comprises reinforcement fibers or a fiber-reinforced plastics material.

The injection bores are preferably disposed at uniform spacings along the gear rim circumference. Preferably, at lest four injection bores, furthermore preferably more than six injection bores, are provided along the gear rim circumference. Twelve injection bores are particularly preferably provided along the gear rim circumference. It is furthermore conceivable and possible for injection bores to be provided in a plurality of, for example two, rows along the gear rim circumference so as to connect in a materially integral and form-fitting manner the insert part to the gear rim.

The injection-molding method is carried out such that the support ring does not project beyond the end sides of the teeth of the gear rim. The support ring is preferably configured so as to be planar on the external sides and does not have any protrusions or recesses.

In one preferred embodiment, the support ring in terms of a worm gear vertical axis has inward pointing ribs which in the radial direction are configured so as to be conical. It is advantageous herein for the ribs of the support ring to have a rib thickness and rib spacings which in size are smaller than or equal to the basic wall thickness of the support ring.

The support ring preferably has undercuts which in the production permit jamming between the support ring and the gear rim.

Furthermore provided is a worm gear system for a motor vehicle steering device having a worm gear as described above, wherein the worm gear engages with a worm.

Moreover provided is a method for producing a worm gear for a worm gear system of a motor vehicle steering device. The worm gear system herein comprises a hub, a support element, and a gear rim, wherein the gear rim has a multiplicity of teeth which extend radially outward in terms of a worm gear longitudinal axis. The method comprises the following steps:

providing the hub in the form of an insert part;
inserting the insert part into the gear rim;
injecting a plastics material for configuring the support element between the gear rim and the insert part by means of an injection-molding method specifically in such a manner that the support element in the form of a support ring connects in a form-fitting manner the hub and the gear rim.

It is preferable herein for the gear rim to have injection bores into which the plastics material for configuring the support ring is injected specifically in such a manner that the plastics material is uniformly distributed on both lateral faces between the insert part and the gear rim. As has been described above, the injection bores are positioned at uniform spacings along the gear rim circumference.

The support ring in the cured state preferably does not project beyond the end sides of the teeth of the gear rim. It is advantageous herein for the support ring to be configured planar on the external sides and not to have any protrusions or recesses.

The gear rim is preferably configured in such a manner that the support ring in the cured state has inward pointing ribs which in the radial direction are configured so as to be conical.

The gear rim is furthermore preferably configured in such a manner that the ribs of the support ring in the cured state have a rib thickness and rib spacings which in size are smaller than or equal to the basic wall thickness of the support ring.

The gear rim is preferably configured in such a manner that the support ring in the cured state has undercuts which in the production permit jamming between the support ring and the gear rim.

An electro-mechanical motor vehicle steering device 1 having a steering wheel 2 which is coupled in a rotationally fixed manner to an upper steering shaft 3 and to a lower steering shaft 4 is schematically illustrated in FIG. 1. The upper steering shaft 3 is functionally connected to the lower steering shaft 4 by way of a torsion bar 110. The upper steering shaft 3 is connected in a rotationally fixed manner directly to the steering wheel. The lower steering shaft 4 along the worm gear longitudinal axis S thereof for engaging in a form-fitting manner with an articulated assembly has a partial toothing, said articulated assembly in turn being connected to a steering gear system by way of a shaft. The lower steering shaft 4 is connected in a rotationally fixed manner to a pinion 5. The pinion 5 in a manner known meshes with a tooth segment of a rack 6. The rack 6 is mounted in a steering housing so as to be displaceable in the direction of the longitudinal axis of said rack 6. The rack 6 at the free end thereof by way of ball joints (not illustrated) is connected to control arms 7. The control arms 7 per se in a manner known by way of steering knuckles are in each case connected to one steered wheel 8 of the motor vehicle. A rotation of the steering wheel 2, by way of the connection of the steering shaft 3, 4 and of the pinion 5, leads to a longitudinal displacement of the rack 6 and thus to pivoting of the steered wheels 8. The steered wheels 8 by way of a carriageway 80 are imparted a feedback effect which acts counter to the steering movement. A force which requires a corresponding torque at the steering wheel 2 is consequently required for pivoting the wheels 8. An electric motor 9 of a servo unit 10 is provided for assisting the driver in this steering movement. The servo unit 10 herein can be disposed as a superimposed steering device on the steering column or as a power-assisted installation on the pinion 5 or on the rack 6.

FIG. 2 shows a worm gear system 11 disposed in a housing 100. A worm gear 12 which is connected in a rotationally fixed manner to the steering shaft 4, for example, is provided. The worm gear 12 is driven by way of a worm 13 which in turn is driven by way of the electric motor 9, wherein the drive output 14 of the electric motor 9 for transmitting torque is correspondingly coupled to the worm 13. The worm 13 at both ends thereof is radially supported in the housing 100 by way of a roller bearing 130 and enables angular compensation.

The worm gear 12 having a hub 15, a support ring 16, and a gear rim 17 is illustrated along the worm gear longitudinal axis S in FIG. 3. The hub 15 herein is configured so as to be integral to the output shaft 4 and at the one end of said hub 15 has the toothing for the form-fitting connection to the articulated assembly and at the other side is open in the direction towards the input shaft 3 such that the torsion bar 110 can be introduced thereinto. The torsion bar 110 can also be introduced into the output shaft 4 by way of the end on which the articulated assembly is provided. As is illustrated in FIG. 6, the output shaft has a internal contour in the shape of a cloverleaf so as to receive therein in a form-fitting manner a shaft having a corresponding external contour.

As is shown in FIG. 4, an insert part 150 configures the hub 15. The insert part 15 is preferably made from metal, in particular steel. The gear rim 17 is a single-component plastics material part and is connected to the insert part 150 in a first process step. The insert part 150 to this end has a gear rim 151 which engages in a corresponding recess 170 in an internal side of the gear rim 17. The insert part 150 has a gear rim 151 having a toothing 152, wherein the teeth 152 are directed radially outward in terms of the worm gear longitudinal axis S. One injection bore 175 is in each case provided herein between two protrusions or teeth 152 of the gear rim 151. According to this embodiment, the ratio between the protrusions 152 of the gear rim 151 of the insert part 150 and the injection bores 175 of the plastics-material gear rim 17 corresponds to a ratio of 1:2. In other words: One injection bore 175 is in each case provided between every other depression which is formed between two gear rim teeth 152.

Figure 5:
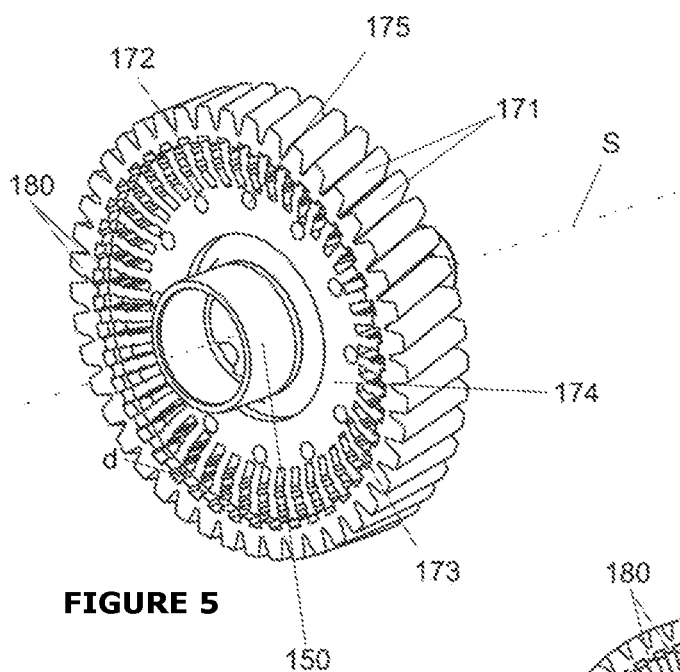
FIG. 5 is a perspective spatial view of the assembled worm gear from FIG. 3.
Figure 6:
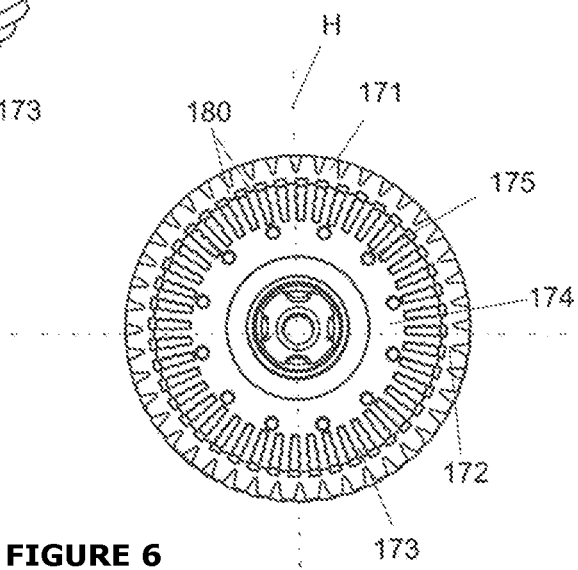
FIG. 6 is a side spatial view of the assembled worm gear from FIG. 3.

The assembled state of the insert part 150 having the gear rim 17 is illustrated in FIGS. 5 and 6. The gear rim 17 has teeth 171 which from a central encircling annular web 172 run radially outward. Reinforcement ribs 173 on the two end sides extend radially from the annular web 172, or radially from the teeth 171, respectively, in the direction of the gear rim center 174 or in the direction of the hub 15. The reinforcement ribs 173 are provided between the injection bores 175 and the teeth 171 of the gear rim 17. A spacing d in the direction of the worm gear vertical axis H is provided between the teeth 171 and the reinforcement ribs such that the reinforcement ribs are inwardly offset in terms of the gear rim toothing. The end sides of the worm gear outside the toothing 171 are thus configured so as to be narrower than in the region of the web 172 or of the toothing. The reinforcement ribs 173 serve as a reinforcement of the gear rim 17. The reinforcement ribs 173 on a lateral face of the gear rim become narrower in the direction of the injection bores 175, or in the direction of the rotation axis S, respectively, and have curvatures. On the other lateral face, proud ribs alternate with lowered reinforcement ribs, wherein said ribs in the longitudinal section of the worm gear are configured so as to be planar. There is no axial symmetry of the reinforcement ribs 173 in this exemplary embodiment. The end sides of the gear rim 17 outside the toothing region have a basic wall thickness. It can furthermore be seen in FIGS. 3 to 6 that the gear rim, opposite the teeth 171 which engage in the worm, has inward pointing teeth 180. The teeth 180 can be configured in the shape of dovetails such that the melt is retained during the injection-molding and a defined fiber orientation can be implemented. The inward pointing teeth 180 serve for improving a materially integral and form-fitting connection to the support ring 16. One inward pointing tooth 180 is provided between each tooth root of the external toothing 171. The gear rim 17 has injection bores 175 into which a plastics material for configuring the support ring 16 is injected.

Figure 7:
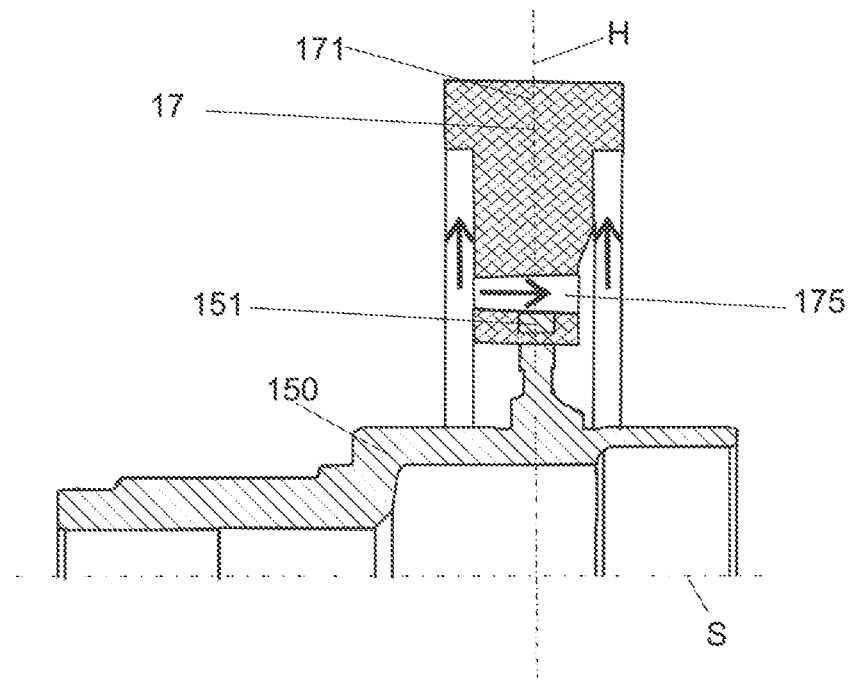
FIG. 7 is a longitudinal sectional view of a completion step of the worm gear.

FIG. 7 schematically shows the injection-molding of the support ring 16. The plastics material is injected into the injection bores 175 and is uniformly distributed along the arrows on both lateral faces between the insert part 150 and the gear rim 17. Since the injection bores 175 penetrate the gear rim 17, apart from the nozzle side, the ejector side is also filled.

Figure 8:
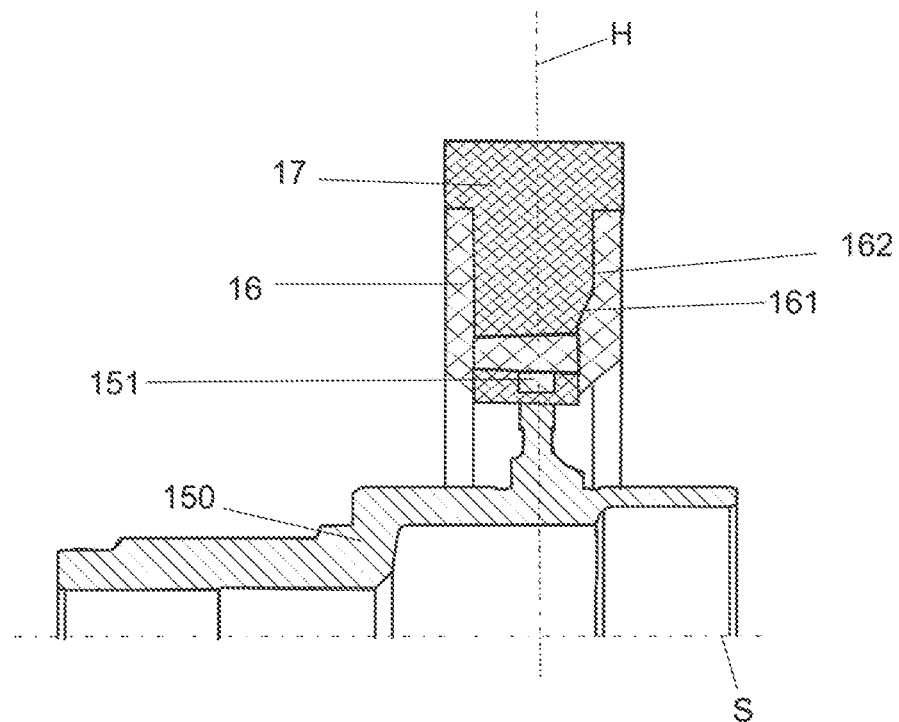
FIG. 8 is a longitudinal sectional view through the completed worm gear having a support ring.

The configured support ring 16 is illustrated in the longitudinal section in FIG. 8. The injection-molding is carried out such that the cured support ring 16 does not project beyond the end sides of the teeth 171 of the gear rim 17. The injected plastics material herein flows through the gear rim 17 and the depressions between the gear rim teeth 152 of the insert part 150. The support ring 16 has inward pointing ribs 161 which in the radial direction are configured so as to be conical and have undercuts 162 such that the support ring 16 jams in the gear rim 17 in production. The rib thickness and the rib spacings of the support ring 16 are chosen such that said rib thickness and said rib spacings in size are smaller than or equal to the basic wall thickness of the gear rim 17, or of the support ring 16, respectively. The component is thus imparted a very high rigidity. The support ring 16 furthermore does not have any depressions or elevations on the external faces.

The support ring 16 formed by injection-molding enables a form-fit and at least in part a materially integral connection between the gear rim 17 and the support ring 16. Said support ring 16 is a highly rigid load-bearing structure which can be economically produced.

What is claimed is:

1. A worm gear for a worm gear system of a motor vehicle steering device, the worm gear comprising:
    a hub;
    a support element configured as a support ring; and
    a gear rim having teeth that extend radially outward relative to a worm gear longitudinal axis,
    wherein the support element is injected molded between the gear rim and the hub, wherein the support element connects the hub and the gear rim in a form-fitting manner,
    wherein the gear rim includes injection bores that, between the worm gear longitudinal axis and reinforcement ribs of the gear rim, are configured for injecting a plastics material for configuring the support ring.

2. The worm gear of claim 1 wherein the reinforcement ribs, on both end sides, from the teeth extend radially in a direction of the worm gear longitudinal axis.

3. The worm gear of claim 1 wherein the gear rim is a single-component plastics material part.

4. The worm gear of claim 1 wherein an insert part that forms the hub is comprised of steel.

5. The worm gear of claim 4 wherein the gear rim is a first gear rim, wherein the insert part has a second gear rim with teeth that engages in corresponding recesses in an internal side of the first gear rim.

6. The worm gear of claim 1 wherein the support ring does not project beyond end sides of the teeth of the gear rim.

7. The worm gear of claim 1 wherein the support ring has inwardly pointing ribs that are conical in a radial direction.

8. The worm gear of claim 7 wherein the ribs have a rib thickness and rib spacings that in size are smaller than or equal to a basic wall thickness of the support ring.

9. The worm gear of claim 1 wherein the support ring includes undercuts that in production permit jamming between the support ring and the gear rim.

10. A worm gear system for a motor vehicle steering device, the worm gear system comprising:
    a worm gear that includes a hub, a support element configured as a support ring, and a gear rim having teeth that extend radially outward relative to a worm gear longitudinal axis, wherein the support element is injected molded between the gear rim and the hub, wherein the support element connects the hub and the gear rim in a form-fitting manner; and
    a worm that engages with the worm gear,
    wherein the gear rim includes injection bores that, between the worm gear longitudinal axis and reinforcement ribs of the gear rim, are configured for injecting a plastics material for configuring the support ring.

11. A method for producing a worm gear for a worm gear system of a motor vehicle steering device that includes a hub, a support element, and a gear rim with teeth that extend radially outward relative to a worm gear longitudinal axis, the method comprising:
    providing the hub configured as an insert part;
    inserting the insert part into the gear rim; and
    injecting a plastics material for configuring the support element between the gear rim and the insert part by way of an injection-molding method such that the support element connects in a form-fitting manner the hub and the gear rim, wherein the gear rim has injection bores into which the plastics material is injected such that the plastics material is uniformly distributed on both lateral faces between the insert part and the gear rim.

12. The method of claim 11 wherein the support element does not project beyond end sides of the teeth.

13. The method of claim 11 wherein the gear rim is configured such that the support element in a cured state has inwardly pointing ribs that are conical in a radial direction.

14. The method of claim 13 wherein the gear rim is configured such that the ribs in the cured state have a rib thickness and rib spacings that in size are smaller than or equal to a basic wall thickness of the support element.

15. The method of claim 11 wherein the gear rim is configured such that the support element in a cured state has undercuts that in production permit jamming between the support element and the gear rim.

* * * * *